Feb. 16, 1960

A. R. WELLS 2,925,599

PROBE TYPE THERMOSTAT

Filed July 29, 1958

*INVENTOR.*
ALTON R. WELLS
BY

ATTYS.

United States Patent Office 2,925,599
Patented Feb. 16, 1960

2,925,599

PROBE TYPE THERMOSTAT

Alton R. Wells, Akron, Ohio

Application July 29, 1958, Serial No. 751,718

5 Claims. (Cl. 200—138)

The present invention relates to thermostats, and especially to a compact, tubular thermostat having a closed end and a fixed spring contact arm therein.

Previously there have been various types of thermostats produced and one style of a thermostat, which has had good commercial acceptance, is that construction shown in U.S. Patent No. 2,586,309 wherein a pair of bi-metal arms are provided and extend into a carrier case for make and break contact action therein dependent upon the temperatures to which the thermostat is subjected. The control action of such thermostats has been calibrated by the specific manner in which the bi-metal arms have been secured in the casing. Another similar construction is that shown in Patent No. 2,497,-397.

In many instances, where the thermostats are used, size is of great importance in that the articles are used with small electric appliances, for example, and in general, it is necessary that the thermostats be as small as is practical, but yet give desirable and accurate temperature control for the circuits involved. Also, in many uses, the thermostats must be immersed in liquid for control of the heating thereof. Hence one end of a thermostat casing has been closed by an end cap, or by compression of the casing in some prior thermostat designs.

Inasmuch as costs are always a factor in the production of any item, and because several thermostats may be used in a number of articles, it is very important that the cost of thermostats be held to a minimum, but that such cost not be reduced or lowered by sacrifice of any quality in the control action of the thermostat. Thus the use of two bi-metal arms, both adjustable for thermostat calibration action, from opposite ends of a case has produced a good thermostat but it is somewhat complex and expensive.

The thermostat of the invention can be readily built into a control device having current sockets or other means associated therewith whereby the probe thermostat can be inserted into different articles and the heating circuits thereof for control action therein.

The general object of the present invention is to provide a novel and improved thermostat characterized by the provision of a thermostat control arm associated with a fixedly positioned spring contact arm in a unit, which spring contact arm remains in one position as the thermostat is calibrated.

A further object of the invention is to provide a deadcase, probe type thermostat with one closed end for insertion into a liquid with no chance of liquid contact with the operative arms within the thermostat, or with the control electric circuit.

Another object of the invention is to provide a thermostat having a pair of cantilever positioned, generally parallel arms therein operatively associated with one end of a thermostat casing from which the thermostat leads extend.

Further objects of the invention are to provide a novel and improved thermostat of reduced cost and having one permanently closed end for insertion into a device for temperature control action, which thermostat has only one bi-metal contact arm or strip therein, and to provide a novel cantilever positioned spring contact arm in a thermostat unit, which spring contact arm is provided with a permanent stress therein to maintain itself in a fixed position against one side of the thermostat case means regardless of changes in the location and/or shape of the end means grasping and positioning a cantilever type bi-metal contact arm and the spring arm in the unit.

The foregoing and other objects and advantages of the invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

Figure 1:
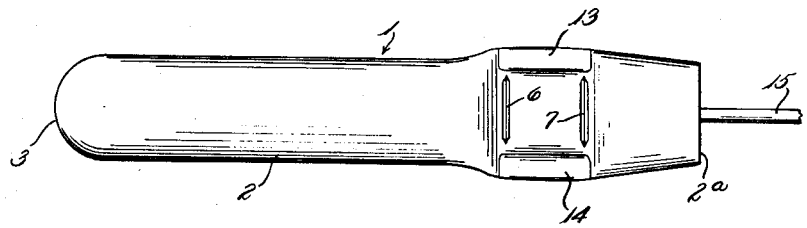
Fig. 1 is an enlarged plan view of a novel thermostat embodying the principles of the invention.
Figure 2:
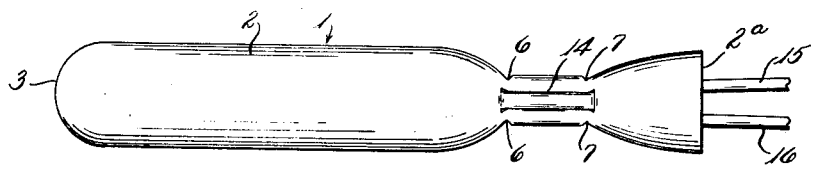
Fig. 2 is a side elevation of the thermostat unit of Fig. 1.

The present invention, generally speaking, relates to a thermostat comprising a casing having one closed end, a bimetal strip secured to said casing at the open end thereof by compressed and flattened sections of the casing determining the calibration setting of the bi-metal strip, said bi-metal strip having a cantilever section extending into the casing from the secured portion thereof and being insulated from the casing, contact means carried by the bi-metal strip in the cantilever section thereof, a conductive spring metal arm secured to the casing at the open end thereof and insulated therefrom, which spring arm also has a cantilever section extending into the casing from the secured portion of the spring arm, an insulating spacer secured to the spring arm and spacing it from the casing, which spring arm is continually resiliently urged or biased towards the casing and is positioned to extend to a point adjacent and axially overlapping the contact means, and a contact means secured to the spring arm for engaging the contact means on the bi-metal strip to make and break a circuit therewith dependent upon the position of such bi-metal strip which is controlled by the temperature conditions to which the thermostat is subjected.

Reference now is directed particularly to the details of the structure shown in the drawing, and a probe type of a thermostat 1 of the invention is indicated and illustrates the currently preferred embodiment of the principles of the invention. This thermostat 1 includes a casing 2 that is formed from any suitable material, usually metallic, and that is of cylindrical or oval shape in section. The casing has a closed end 3 and an initially open end in or to which the operative components of the thermostat 1 are secured. A bi-metal control or contact strip 4 is present in the unit and is of substantially conventional construction for control strips as used in commercial thermostats made at this time. Such strips have the facility of bending from a straight form over to a curved shape in a predetermined direction under predetermined and different ambient temperature conditions.

It will be seen that the bi-metal strip 4 extends into the casing 2 from the open end thereof and with the bimetal strip 4 being insulated from the casing by conventional means, such as a baked silicon-impregnated glass fiber insulation spacer, or sleeve 5. Such spacer or sleeve is clamped around the bi-metal strip 4 by transversely directed, axially spaced stakes or notches 6 and 7 and by axially extending lands 13 and 14 formed in flattened, or compressed portions at the open end of the casing 2 so as to grip the bi-metal strip 4 tightly and secure it in a desired cantilevering position within the casing 2. These stakes or notches 6 and 7 and lands 13 and 14 effectively and tightly anchor or secure end portions of the bi-metal strip in a desired position so that the strip extends into the casing 2 in a controllable position. As explained in said Patent No. 2,586,309, referred to hereinabove, the setting or effective temperatures at which such bi-metal strip 4 makes and breaks contacts with another member in the thermostat 1 can thus be effectively calibrated, or controlled by the stakes 6 and 7.

Any desired type of contact 8 is secured, as by spot welding, or by other suitable action, to the bi-metal strip 4 adjacent the end of the cantilever section therein so that arcuate movement of the cantilever section of the bi-metal strip will bring such contact into engagement with other means as described hereinafter for make and break action of an electrical circuit to be controlled.

As an important feature and element of the present invention, a conductive metal spring arm 9 is secured within the casing 2 by the flattening of the initially open end of the casing when being compressed around one portion of the spring arm 9. The remainder of the spring arm 9 extends into the interior of the casing 2 as a cantilever spring arm section or portion. Again, a suitable insulation sleeve layer, or element 10 is positioned around the spring arm 2 to insulate it against electrical contact with the casing 2 or the adjacent bi-metal strip 4. Such insulation 5 and 10 and the means positioned thereby effectively seal the casing 2. The spring arm 9 and the bi-metal strip 4 naturally extend from the end of the insulation 5 and 10 for engagement with suitable leads connecting the thermostat 1 to the electrical circuit to be controlled.

Figure 3:
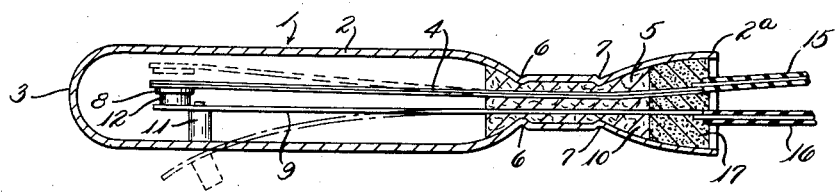
Fig. 3 is a vertical section through the novel thermostat unit of Figs. 1 and 2 and with the bi-metal strip being indicated in dotted lines in its circuit open position and with the unloaded position of the contact arm also being indicated in dotted lines.

Fig. 3 of the drawings best shows that an insulation spacer or nubbin 11 is secured, as by cementing, or by a rivet, or other conventional means, to the cantilever section of the spring arm 9 to protrude therefrom towards the inner wall of the casing 2. Such spring arm 9 is of an initial shape, as indicated in dotted lines in Fig. 3, that it inherently is biased towards, or urged against the inner wall of the casing 2 and will maintain itself in contact therewith even though the stakes or notches 6 and 7 in the end of the casing 2 to which the spring arm 9 is secured have appreciable variation or change therein when calibrating the thermostat 1 for operative action. It also will be seen from the drawings that the spring arm 9 axially overlaps the contact 8 on the end of the bi-metal strip 4. Any suitable contact member or means 12 is secured to the spring arm 9 by any conventional means so that the contact means 12 can engage the contact 8 for making and breaking an electrical circuit with the lead connecting to the bi-metal strip 4. Obviously the contacts used may be of any conventional design and may have either flat disc-like faces, or may be of a convex shape, or both contacts can be flat, or rounded, as desired.

It will be seen that the novel thermostat of the invention is dead or insulated with relation to the controlled electrical circuits and conductive means extending into the casing 2. The casing 2 can be rapidly and inexpensively made by conventional procedures and provide a permanently closed end probe type of a thermostat.

It should be realized that in some instances, it may be possible to make the casing of the thermostat of the invention from non-conductive material and in such instances the bi-metal strip would not necessarily have to be insulated therefrom, and it is within the scope of the present invention to use any suitable type of a positioning arm in lieu of the bi-metal strip referred to herein to provide the desired movement or control action in the thermostat by change of position of such arm dependent upon the temperature conditions to which the thermostat is subjected. It likewise should be recognized that the spring arm of the thermostat may have any suitable type of or even no spacer element provided thereon dependent upon the electrical conductivity characteristics of the casing. Furthermore, such spacer element might be a flange or boss formed integrally with the spring arm 10, if a non-conductive casing is used.

While the present invention shows the use of a specific or extra contact means on the bi-metal strip used in the thermostat, in some instances it may be satisfactory to use an integral portion of such strip for the actual contact section in the thermostat.

The spring arm 9 of the thermostat can be made from any suitable material, such as phosphor-bronze or other good conductive metal, as desired, and likewise the contact means shown thereon may be integral with such spring arm in some instances, or may be separate elements as shown in the drawing.

The casing 2 obviously must be made from material having good thermal conductivity. The insulation means used insulate the bi-metal strip 4 from direct electrical or heat conduction contact with the casing.

Usually in making the thermostat of the invention, the bi-metal strip 4 and the metal arm 9 are set in position by compression of the casing to form the stakes 6 and 7 and lands 13 and 14 that are spaced from the end of the casing 2. The thermostat is baked to set the insulation to a substantially hard, final form and to relieve the manufacturing stresses in the casing 2. Insulated leads 15 and 16 are welded to the bi-metal strip 4 and the spring arm 9, respectively, within the open end 2a of the casing. A suitable insulating means, specifically a cement 17, such as one made from epoxy resin, is introduced around the leads 15 and 16 and set up in position to aid in sealing the end 2a of the casing. Hence the probe-type thermostat can be immersed in liquids for control of a heating supply circuit therefor. Lastly, the thermostat is calibrated by bending the end of the casing as described in said patents.

It will be realized that the thermostat 1 can be built into a connector and control device for use with several articles for heat control action. Of course the closed end 3 of the casing 2 would protrude from the remainder of the control device to extend into the article to measure the temperature therein.

From the foregoing it will be seen that a novel, improved probe type of a thermostat having one permanently closed end for insertion into an article for temperature control action has been provided by the invention. This thermostat is of compact size and has a minimum of deviation from the manufacturing and production operations used in making prior types of thermostats This improved thermostat will effectively control the operation of a circuit and the bi-metal strip of the thermostat can readily be calibrated to make or break contacts at different operative temperature conditions without changing the effective position of the spring arm 9. Furthermore, the casing and thermostat of the invention avoid any contact receiving hole in the casing and the drawn end of the casing avoids use of a compression seal at that part of the casing. Hence, it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. In a thermostat, a conductive casing having a closed end and an open end, a bi-metal strip secured at one portion thereof to said casing at the open end thereof in insulated relation to said casing and having a cantilever section extending into said casing, contact means secured to said cantilever section of said bi-metal strip, said bi-metal strip being calibratable by pairs of transversely extending axially spaced stake-like areas at the open end of said casing where said bi-metal strip is secured thereto, a conductive spring metal arm secured to said casing at the open end thereof, insulation means sealing the open end of said casing and insulating said strip and metal arm from each other and said casing, said metal arm having a cantilever section extending into said casing to a point axially overlapping said contact means and continually urged towards said casing, an insulation spacer secured to said metal arm cantilever section and urged against said casing by said metal arm, and additional contact means secured to said metal arm cantilever section for engaging said first named contact means whereby said bi-metal strip can be calibrated independently of any change in position of said spring-metal strip.

2. In a thermostat, a casing having a closed and an open end, a bi-metal strip secured at one portion thereof to said casing at the open end thereof in insulated relation to said casing and having a cantilever section extending into said casing, contact means secured to said cantilever section of said bi-metal strip, said bi-metal strip being calibratable as to its opening and closing action by a pair of transversely extending axially spaced stake-like areas at the open end of said casing where said bi-metal strip is secured to said casing, a conductive metal arm secured to said casing at the open end thereof and insulated therefrom, said metal arm having a cantilever section extending into said casing to a point axially overlapping said contact means, an insulation member carried by said metal arm cantilever section and urged thereby against said casing at all times regardless of change in position of said metal arm by said stake-like areas, and additional contact means secured to said metal arm cantilever section for engaging said first named contact means to make and break electrical contact therewith.

3. In a thermostat, a tubular casing having a permanently closed end and an initially open end, a bi-metal strip secured at one portion thereof to said casing at the initially open end thereof by flattened areas of said casing and having a cantilever section extending into said casing, contact means secured to said cantilever section by said bi-metal strip, said bi-metal strip being calibratable and positioned by its engagement with said casing, a conductive spring metal arm secured to said casing at the open end thereof, said metal arm having a cantilever section extending into said casing to a point axially overlapping said contact means, said metal arm having inherent resiliency to urge it continuously towards said casing and locate it in a fixed position with relation thereto, said metal arm and said bi-metal strip being insulated from each other and from said casing, and additional contact means secured to said metal arm cantilever section for engaging said first named contact means to form an electric circuit between said bi-metal strip and said metal arm.

4. A thermostat as in claim 2 where said stake-like areas are spaced axially from the open end of said casing, insulated leads are secured to said bi-metal strip and to said metal arm axially within said casing, and insulating means is positioned around said leads within said casing.

5. A thermostat comprising a casing having one initially open end and one closed end, a bi-metal strip secured to said casing at the initially open end thereof and having a cantilever section extending into said casing from the secured portion thereof, a contact means operatively associated with said bi-metal strip at the cantilever section thereof, a conductive spring arm secured to said casing at the open end thereof, said spring arm having a cantilever section extending into said casing from the secured portion of such spring arm, insulation and spacer means carried by only said spring arm and protruding therefrom to engage said casing, said spring arm being continually resiliently urged towards said casing and being held in a fixed position by engagement therewith but being insulated therefrom, insulation means engaging said bi-metal strip and said spring arm and said casing to insulate them from each other at the initially open end of said casing, said casing having flattened portions therein adjacent its initially open end extending transversely and axially thereof to position said bi-metal strip and calibrate its movement and seal said casing around said insulation means, and contact means operatively associated with said spring arm for engaging said first-named contact means on said bi-metal strip to make and break contacts therewith dependent upon the position of said bi-metal strip and the temperature to which the thermostat is subjected, said bi-metal cantilever section being independent of said spring arm.

References Cited in the file of this patent

UNITED STATES PATENTS

| | | |
|---|---|---|
| 2,192,960 | Bokovoy | Mar. 12, 1940 |
| 2,320,811 | Cook | June 1, 1943 |
| 2,497,397 | Dales | Feb. 14, 1950 |
| 2,745,924 | Coates | May 15, 1956 |
| 2,855,485 | Webking | Oct. 7, 1958 |

OTHER REFERENCES

Haas, German printed application, 1,023,116, printed Jan. 23, 1958.